(12) United States Patent
Cocks et al.

(10) Patent No.: US 8,930,521 B2
(45) Date of Patent: Jan. 6, 2015

(54) METHOD, APPARATUS, AND COMPUTER PROGRAM PRODUCT FOR ENABLING MONITORING OF A RESOURCE

(75) Inventors: Stephen James Cocks, Winchester (GB); Stephen James Hobson, Middlesex (GB); William T. Newport, Rochester, MN (US); Graham Derek Wallis, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 2423 days.

(21) Appl. No.: 11/459,944

(22) Filed: Jul. 26, 2006

(65) Prior Publication Data

US 2007/0038744 A1 Feb. 15, 2007

(30) Foreign Application Priority Data

Aug. 11, 2005 (GB) .................................. 0516554.3

(51) Int. Cl.
*G06F 15/173* (2006.01)
*H04L 12/26* (2006.01)

(52) U.S. Cl.
CPC .......... *H04L 43/0817* (2013.01); *H04L 43/024* (2013.01); *H04L 43/10* (2013.01)
USPC ............ 709/224; 709/220; 709/221; 709/223

(58) Field of Classification Search
USPC .................................. 709/224, 225, 226, 228
See application file for complete search history.

(56) References Cited

U.S. PATENT DOCUMENTS

| 5,974,457 | A | * | 10/1999 | Waclawsky et al. | .......... | 709/224 |
| 7,747,730 | B1 | * | 6/2010 | Harlow | .......... | 709/224 |
| 2002/0083169 | A1 | * | 6/2002 | Aki et al. | .......... | 709/224 |
| 2003/0229693 | A1 | * | 12/2003 | Mahlik et al. | .......... | 709/224 |
| 2004/0064552 | A1 | * | 4/2004 | Chong et al. | .......... | 709/224 |
| 2004/0162901 | A1 | * | 8/2004 | Mangipudi et al. | .......... | 709/225 |
| 2005/0117576 | A1 | * | 6/2005 | McDysan et al. | .......... | 370/389 |
| 2005/0198298 | A1 | * | 9/2005 | Nishikawa et al. | .......... | 709/226 |
| 2005/0273502 | A1 | * | 12/2005 | Patrick et al. | .......... | 709/217 |
| 2006/0064481 | A1 | * | 3/2006 | Baron et al. | .......... | 709/224 |
| 2006/0248165 | A1 | * | 11/2006 | Sridhar et al. | .......... | 709/218 |
| 2006/0277295 | A1 | * | 12/2006 | Masuda et al. | .......... | 709/224 |
| 2007/0011315 | A1 | * | 1/2007 | Hartung | .......... | 709/224 |

OTHER PUBLICATIONS

"Remote Network Monitoring (RMON) Protocol Identifiers for IPv6 and Multi Protocol Label Switching (MPLS)"—Stehpan et al, IETF, May 2004 http://tools.ietf.org/html/draft-ietf-rmonmib-pi-ipv6-04.*
Infospheres Group—(Monitoring) Caltech: www.infospheres.caltech.edu/crisis_web/monitoring.html, Computer Science, Last update Mar. 8, 2004.

* cited by examiner

*Primary Examiner* — Randy Scott
(74) *Attorney, Agent, or Firm* — Grasso PLLC; Fred Grasso

(57) ABSTRACT

To enable adaptive monitoring of the resource, metrics about the workload received at the resource from one or more clients are used to derive monitoring feedback comprising a recommendation as to how the monitoring should be performed. This is then used as input to a decision making process controlling the monitoring of the resource. The recommendation may be for the monitor to increase or decrease its monitoring interval. The resource may decide to increase or decrease its monitoring depth or checking, or may suggest a new monitoring depth to the monitor.

30 Claims, 5 Drawing Sheets

METHOD, APPARATUS, AND COMPUTER PROGRAM PRODUCT FOR ENABLING MONITORING OF A RESOURCE

FIELD OF THE INVENTION

The present invention relates to the monitoring of a resource.

BACKGROUND

To ensure the availability of resources in a production system, it is normal to use a cluster framework (e.g. The Microsoft® Cluster Server—Microsoft is a trademark of Microsoft Corporation in the United States and other Countries) or other monitoring component to regularly interrogate the status of such resources. Such a monitoring component typically polls monitored resources at configured intervals in order to receive back a true/false indication as to whether a resource is available or not. The advantage of explicit monitoring is that it is possible for the monitor to detect failure of a resource. The problem with this is that the monitoring itself may interfere with the performance of the monitored resource. This is because such interrogation adds a monitoring load to a resource which may already be extremely busy. Another problem is that such monitoring can also undermine the ability to quiesce a lightly used resource. For example, periodic status polling could prevent such a resource from being paged out.

Monitoring may be acquired from a fixed set of sources (monitors) each with their own fixed (monitoring) schedule or monitoring may be adaptive. With adaptive monitoring, data values that are likely to enter critical regions in the near future can be monitored with greater frequency or the detail level of the monitoring data retrieved may be adaptively increased or decreased. For example, an increased level of data may be requested if a low-level of monitoring returns an error. Any increase or decrease of detail level is however pre-configured.

U.S. Patent Application 2002/0112040 discloses a method and system for network management with per-endpoint monitoring based on application lifecycle. As disclosed on pages 14, 15, and 16, as network management applications dynamically discover systems or devices within one or more networks, this solution allows the management system to dynamically change the polling interval based on life cycle (age, stage, phase, of the network and/or its management applications).

SUMMARY

Accordingly the invention provides a method for a resource to enable adaptive monitoring of the resource, the method comprising: using metrics about workload received at the resource from one or more clients to derive monitoring feedback, the monitoring feedback being a recommendation as to how the monitoring should be performed; and using the monitoring feedback as input to a decision making process controlling the monitoring of the resource.

The decision making process may be located at the resource itself or may be part of the monitor. Information input to the decision making process is in the form of a recommendation only. It is up to the resource/monitor to decide whether it is appropriate to implement the recommendation. Factors such as network congestion, importance of the resource, and the like may also be taken into account.

The derived feedback may be provided to a monitor thereby enabling the monitor to determine whether to adjust its monitoring of the resource in line with the received feedback.

The workload metrics may be collected at the resource itself or may be retrieved from a separate component by the resource. Such metrics could be collected within a predetermined period (e.g., 10 s), or over a number of client requests (e.g., 100), or may be the workload received between status requests from the monitor, and the like. At the end of such a period/number of requests, old metrics may be deleted and these are then preferably replaced with new metrics.

Preferably the metrics relate to the amount of work that the resource is processing, i.e., how busy the resource is, or how critical the work is. For example, does the work relate to persistent data that must be logged? Is the work from a customer of a particular type such as a "gold customer" who is a customer with a high-value service contract? In the messaging world, has a particular topic or queue been used?

The amount of work being processed is preferably determined by measuring the number of work requests received, for example, with a predetermined period such as, for example, a time period or the period between status requests from a monitor.

Preferably one or more rules are used to derive monitoring feedback. Such feedback could be about monitoring interval or monitoring depth. In addition to workload metrics, other data could be used. For example environmental data or service level agreement data could be used.

In one embodiment, the derived feedback is used to determine which monitoring depth (level of checking) to use.

In another embodiment, the derived feedback is used to recommend a monitoring depth to the resource. The resource may then perform the recommended depth monitoring or may request that level of depth monitoring.

If it is determined that the resource is lightly loaded, then the recommendation provided may indicate that the monitoring interval can be extended. Equally, if the resource is busy, the recommendation may be the same, so as not to add to the resource load.

In one embodiment, the workload metrics enable a determination to be made that the resource is about to change state. Such a determination can then be used to potentially affect the monitoring of the resource as input to the decision making process. A particularly interesting state transition, for example, is between running and quiescent. In this example, the recommendation might be to monitor the resource very infrequently so as not to cause the resource to consume system resources; for example, to be paged back into memory.

If it is determined that a predetermined amount of the work being processed by the resource is critical, then the feedback recommendation may be that the monitoring interval be shortened.

If it is determined that a predetermined amount of the work being processed by the resource is critical, then the recommendation may be that the monitoring depth be increased.

Note that monitoring feedback may be calculated in response to a status request from the monitor. Alternatively the resource may push such information upon the monitor periodically.

In one embodiment, information may be determined about the current monitoring of the resource by the monitor. This may then be used to determine whether to affect the current monitoring of the resource; for example, to suggest a new monitoring interval/new depth.

According to another aspect, there is provided a method for adaptive monitoring by a monitor of the resource in a network, the method comprising: receiving monitoring feedback from the resource, the monitoring feedback being a recommendation as to how the monitoring should be performed; and using the monitoring feedback to determine whether to adapt the way in which the monitor is monitoring the resource. The feedback may be used by the monitor to request a new monitoring depth or to change the monitoring interval.

According to another aspect, there is provided apparatus for a resource to enable adaptive monitoring of the resource, the apparatus comprising: means for using metrics about workload received at the resource from one or more clients to derive monitoring feedback, the monitoring feedback being a recommendation as to how the monitoring should be performed; and means for using the monitoring feedback as input to a decision making process controlling the monitoring of the resource.

According to another aspect, there is provided an apparatus for adaptive monitoring by a monitor of the resource in a network, the apparatus comprising: means for receiving monitoring feedback from the resource, the monitoring feedback being a recommendation as to how the monitoring should be performed; and means for using the monitoring feedback to determine whether to adapt the way in which the monitor is monitoring the resource.

According to another aspect, there is provided a computer program comprising program code means adapted to perform the following method steps when the program is run on a computer: using metrics about workload received at the resource from one or more clients to derive monitoring feedback, the monitoring feedback being a recommendation as to how the monitoring should be performed; and using the monitoring feedback as input to a decision making process controlling the monitoring of the resource.

According to another aspect, there is provided a computer program comprising program code means adapted to perform the following method steps when the program is run on a computer: receiving monitoring feedback from the resource, the monitoring feedback being a recommendation as to how the monitoring should be performed; and using the monitoring feedback to determine whether to adapt the way in which the monitor is monitoring the resource.

BRIEF DESCRIPTION OF THE DRAWINGS

A preferred embodiment of the present invention will now be described, by way of example only, and with reference to the following drawings, of which.

DETAILED DESCRIPTION

Figure 1:
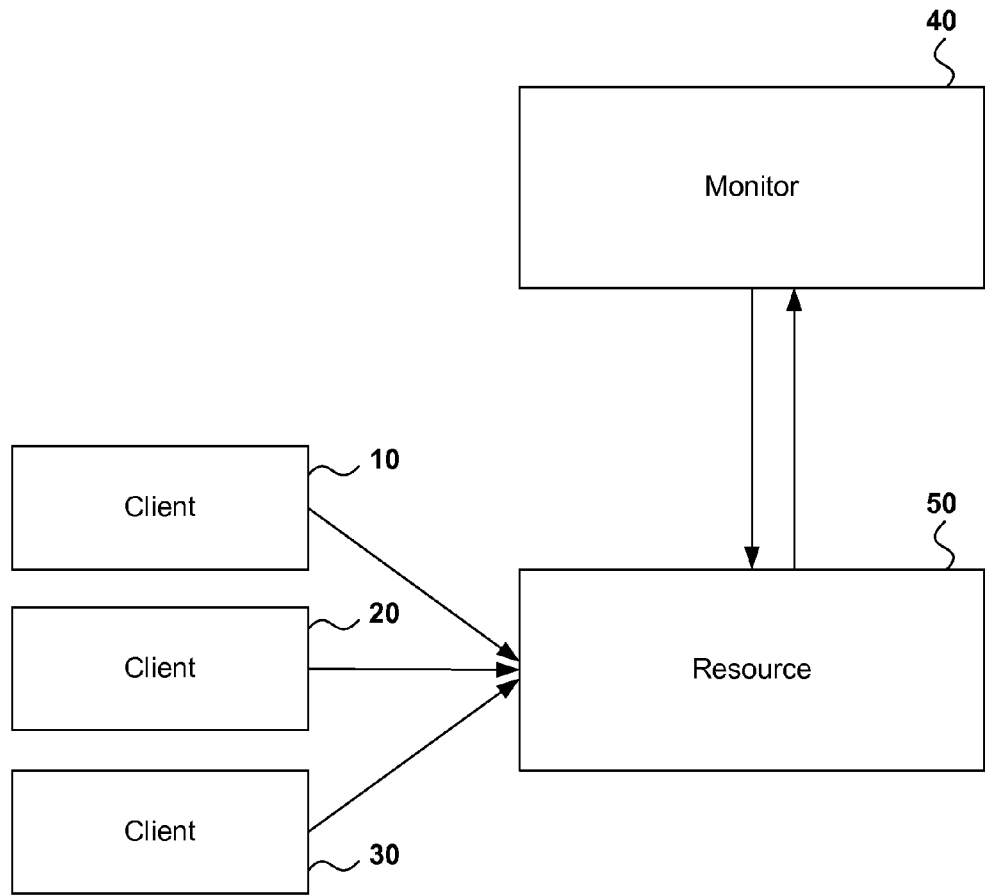
FIG. 1 illustrates an overview of the components of the present invention in accordance with a preferred embodiment.

With reference to FIG. 1, and as alluded to above, a plurality of clients 10, 20, 30 make requests to a resource 50 for processing. The resource could be a messaging system, a messaging system queue, a database, a web service, a publish/subscribe (pub/sub) system, or the like.

To ensure continued availability of resource 50, a monitor 40 periodically polls the resource for a status update. If no response is received following a status request, the monitor is able to instigate corrective action. For example, an alert may be provided to an administrator or a backup server may be brought online.

Figure 2:
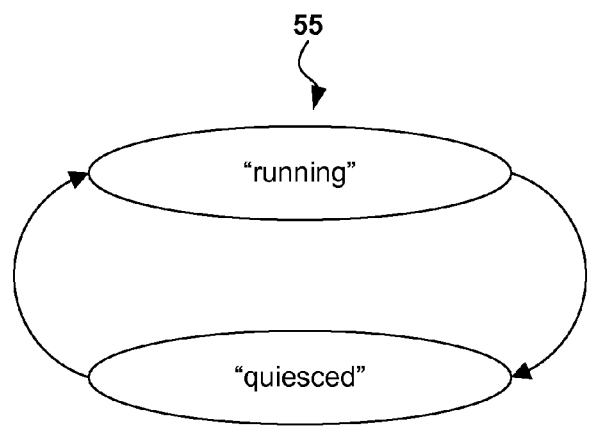
FIG. 2 shows the possible states of a monitored resource in accordance with a preferred embodiment of the present invention.

As illustrated with respect to FIG. 2 and by way of example only, when operational, a resource is typically in one of two states 55. A resource may be "running" (operational) or "quiescent". A resource will typically quiesce when no client workload (w/l) has been received for a preconfigured period of time. In this way, the resource is able to conserve energy, not consume processing resource, until it is required.

As discussed in the background section, periodic polling of a resource may cause an idle resource to alternate continually and potentially unnecessarily between the two states. Alternatively, it may add an unnecessary and burdensome load to an already busy resource. The depth of monitoring performed may also be burdensome.

The present invention, in accordance with a preferred embodiment, addresses this problem by adding flexibility to the monitoring process. The present invention uses collected metrics as input to a decision making process which can then determine whether or not to adapt the monitoring process.

Monitor 40 is able, in accordance with the preferred embodiment, to poll resource 50 in order to determine a) whether the resource is currently available; and b) additional information providing i) a recommended monitoring interval and ii) the monitoring depth being used by the resource and/or the suggested depth to be used.

Via the mechanism described below, the monitor may receive feedback on its monitoring and can use this with regard to subsequent polling of the resource. Thus the monitor uses a variable monitoring interval. The monitoring depth may also be variable. Interval and depth are controlled autonomically by the monitor and resource, based on factors such as the recent workload and the type of work being performed by the resource.

Herein the term "depth" is intended to encompass the level of checking performed. For example, it may be possible to perform only a cursory or a very detailed check of a resource. It is the monitor that requests a check. However the choice as to which check is made, is preferably chosen by the resource. The resource may autonomically perform its selected check or may indicate to the monitor which check it recommends is used from now on.

The resource preferably indicates to the monitor a recommendation on polling interval based on workload, the criticality of the work, the proportion of time that the resource is quiescent relative to the time spent in the running state etc. However the monitor will eventually poll, however frequently, and the resource can still determine the monitoring depth it is prepared to do.

Thus, for example, a critical resource that is usually running should be polled quite frequently, but that the resource itself may choose to do only cursory level of checking when polled, so as to avoid excessive overhead.

Figure 3A:
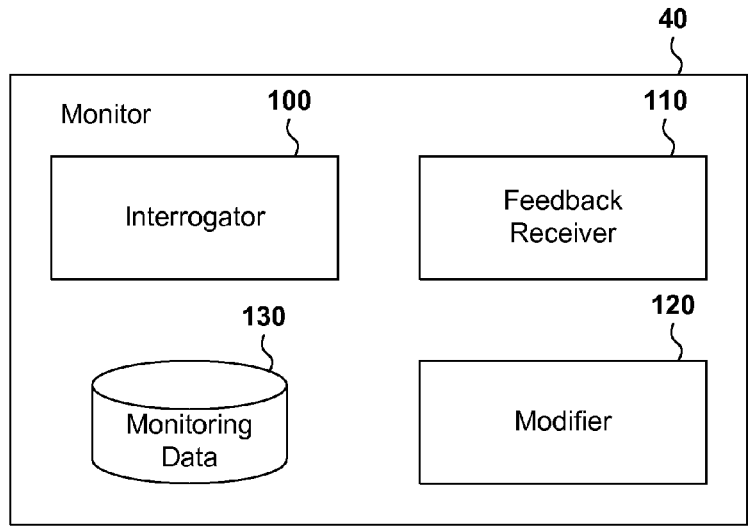
FIG. 3a provides a detailed view of the monitor in accordance with a preferred embodiment of the present invention.
Figure 3B:
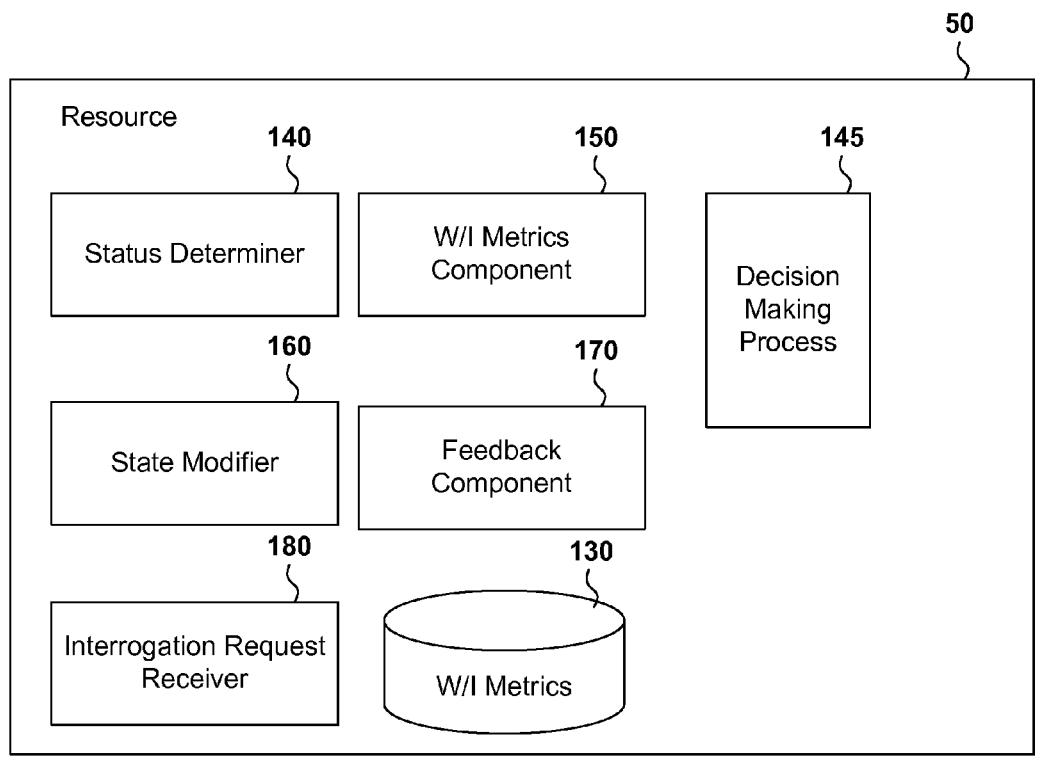
FIGS. 3b and 3c provide a detailed view of the resource in accordance with a preferred embodiment of the present invention.
Figure 3C:
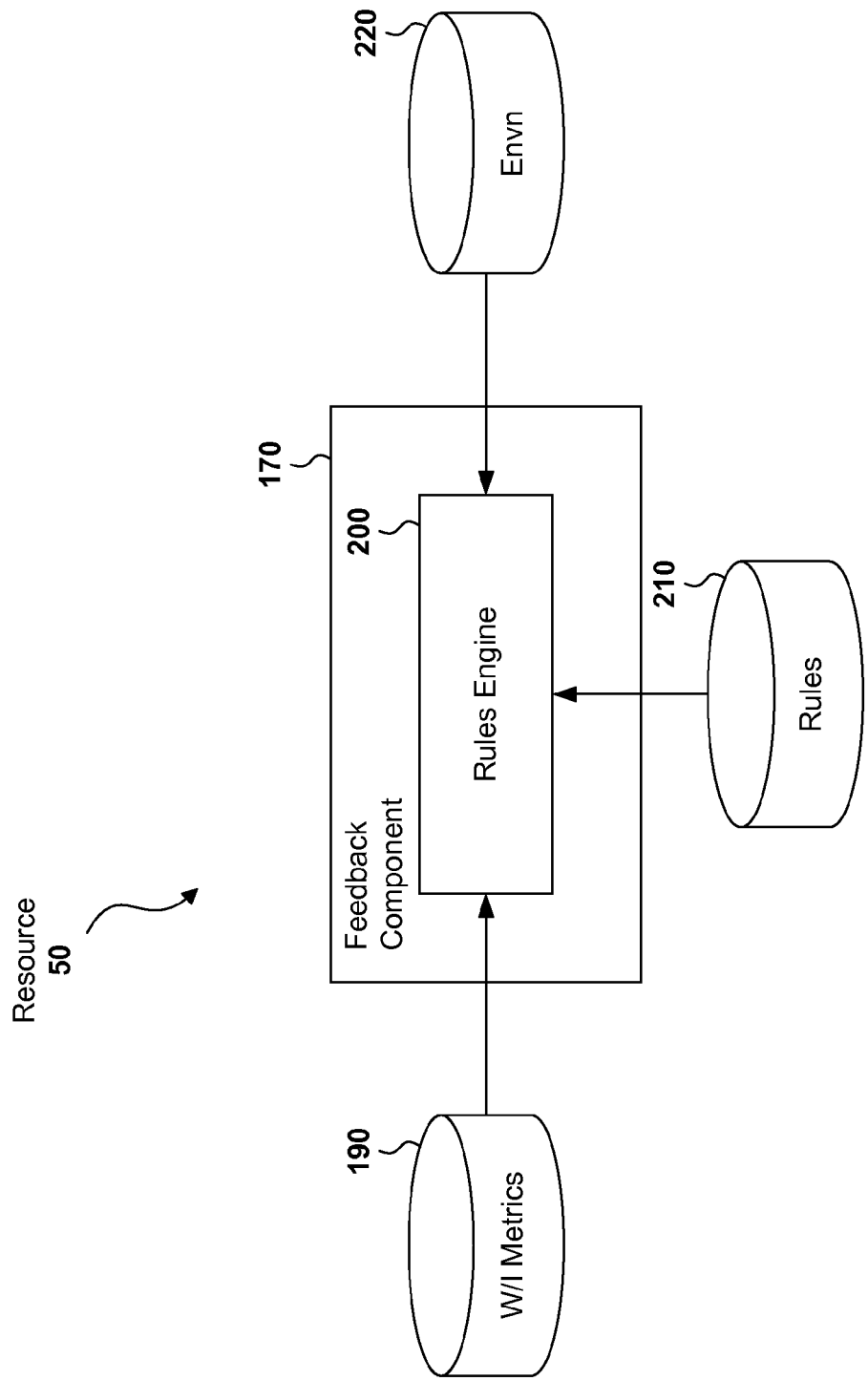
Figure 4:
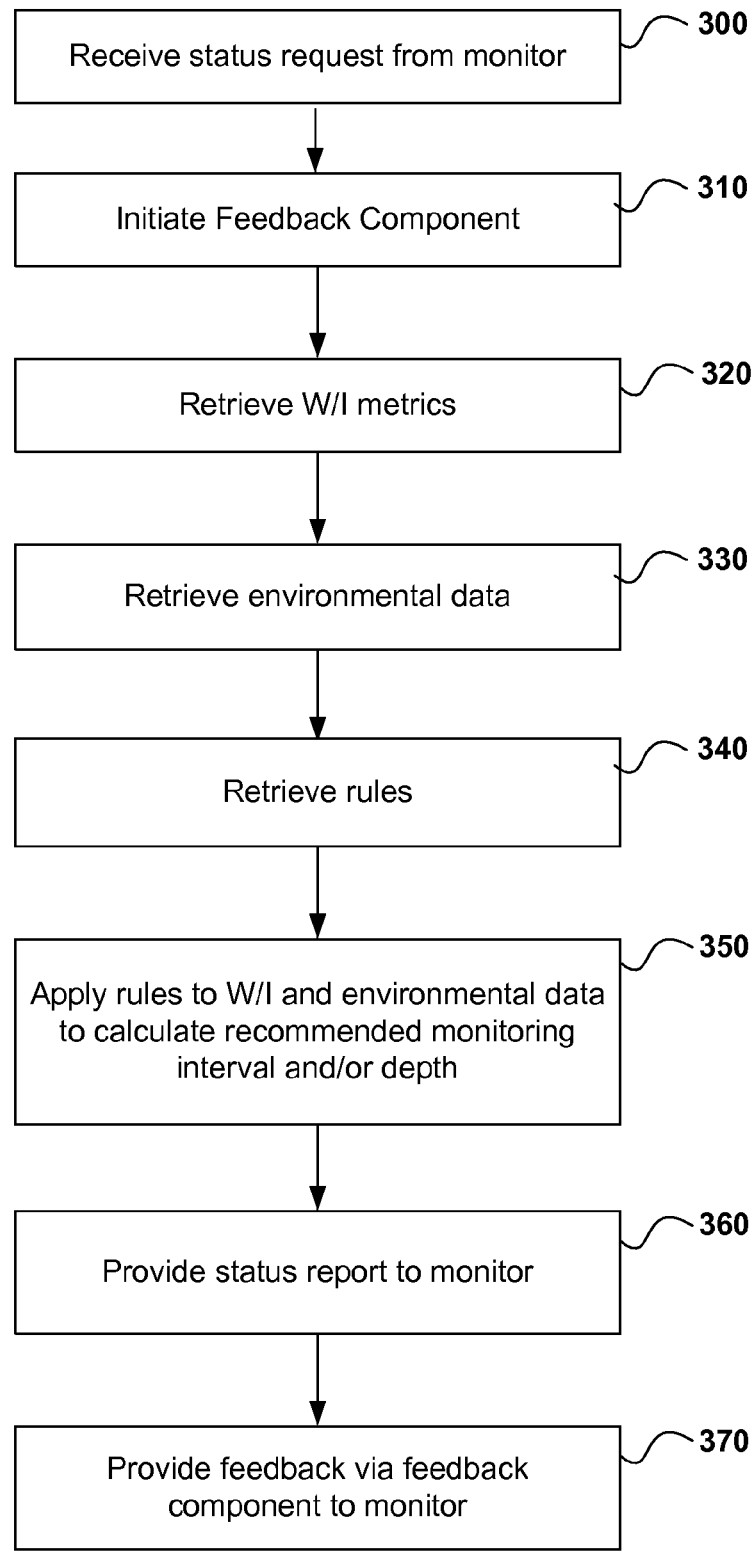
FIG. 4 illustrates the processing of the resource in accordance with a preferred embodiment of the present invention.
Figure 5:
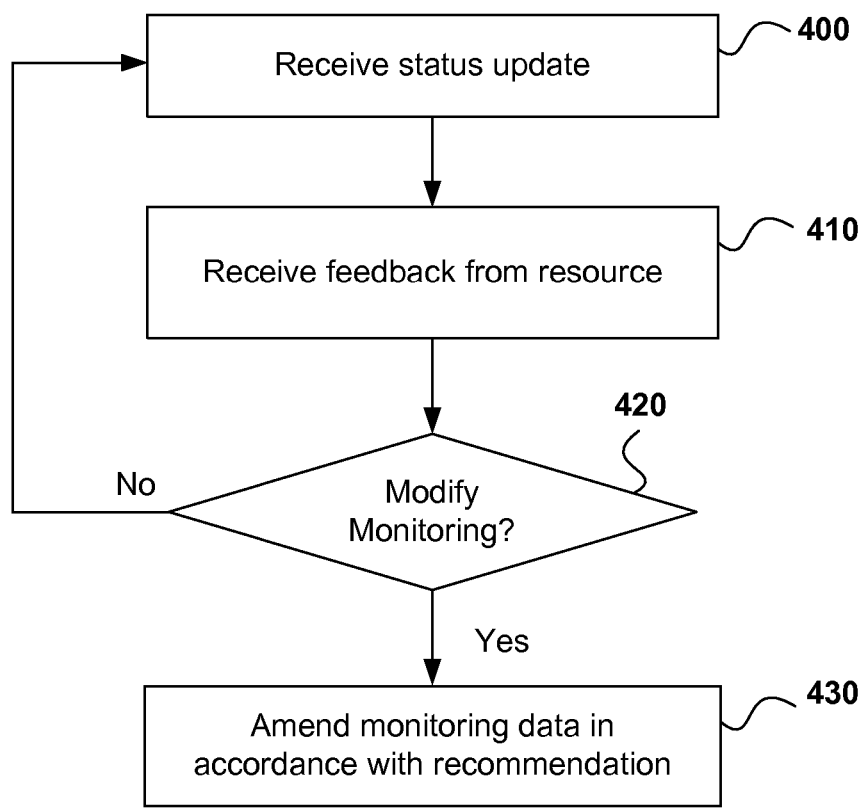
FIG. 5 shows the processing of the monitor in accordance with a preferred embodiment of the present invention.

FIGS. 3a, 3b and 3c provide a detailed view of monitor 40 and resource 50 in accordance with the preferred embodiment. FIG. 4 illustrates the processing by the resource in accordance with a preferred embodiment of the present invention. FIG. 5 illustrates the processing of the monitor in accordance with a preferred embodiment of the present invention. The figures should be read in conjunction with one another.

A monitor interrogator component 100 periodically polls resource 50 for a status update. Monitoring data 130, stored local to the monitor, is used to determine how often to poll the resource. For example, such data may specify a default of every 10 seconds.

An interrogation request receiver 180 in the resource receives the status requests from monitor 40 (step 300) and tasks feedback component 170 with responding to the monitor if appropriate (step 310). Feedback component 170 accepts input from workload (w/l) metrics component 150 prior to providing any feedback to the resource.

Workload metrics component 150 monitors the workload received by the resource whilst the resource is "running". Workload metrics are stored in database 190. These may include things such as:
i) The number of client requests received within a defined time period
ii) The time since the last request
iii) An average interval between requests
iv) CPU usage; % monitoring compared with % true workload
v) Percentage of the time spent quiescent
vi) Criticality of workload; for example in a messaging system:
   message persistence (i.e., whether the message is to be logged)
   message topics, where the resource is a publish/subscribe system
   type of subscribers, where the resource is a pub/sub system
   payload
   value of transactions.

Such information can then be used by the feedback component 170 to calculate or derive a monitoring recommendation and to feed this back to monitor 40 if appropriate. The output of the feedback component is a recommendation only. This may be provided to the monitor which may then use the recommendation as input to a decision making process which controls the way in which the monitor monitors the resource, for example the polling interval. The monitor does not have to follow the resource's recommendation and may use other factors to decide that the recommendation is not appropriate in this instance. For example, if a communications link between the monitor and the resource is operating particularly slowly, then it may not be appropriate to poll the resource more frequently. Rather than providing feedback to the monitor, the feedback component may input its recommendation to a decision making process 145 within the resource itself which can decide whether a particular recommendation is appropriate. For example, whether it is appropriate to autonomically increase the monitoring depth used by the resource irrespective of the monitor's request. The resource may know, for example, that it is classed as a low priority resource and that it will never be appropriate to increase the monitoring depth.

As indicated above, although the decision making process is illustrated as box 145 in FIG. 3b (the resource), such a process may equally be found a part of the monitor instead.

FIG. 3c illustrates the resource in more detail. Feedback component 170 comprises a rules engine 200 which accepts as input workload metrics 190, rules 210 and environmental data (steps 320, 330, 340). Environmental data may include anything that can be sensed or learned by the resource and probably is most significant when such information is not directly available to the monitor. A good example would therefore be anything to do with the environment that the resource is running in, such as temperature or humidity, which may be important when the monitor is reasonably remote from the resource. Further a resource may know when are its busiest times and may use this to provide a recommendation. For example, a system may be particularly busy between 9 am and 5 pm on weekdays, whilst being relatively idle the rest of the time.

Such input is used by the rules engine to calculate or derive a recommended monitoring depth or interval (feedback) (step 350) and to provide, if appropriate, such feedback to the monitor via the feedback component 170 (step 370). Such input is, of course, by way of example only.

Note, the feedback component 170 also provides a response to the status request to the monitor (step 360). The feedback may be piggybacked onto the status report sent at step 360.

Some of the following rules may be used:
i) If the number of messages received within 60 minutes exceeds 2000, workload is extremely high; 1000-2000 workload is high; 100-1000 workload is medium, less than 100 workload is low;
ii) If any of the messages within 60 minutes is persistent (i.e. must be logged), workload is critical else workload is non-critical;
iii) If message is received from a subscriber of type "gold customer", message is critical, else workload is non-critical;
iv) If message includes the keyword "complaint" in its payload, message is critical;
v) If message is published on any of the following topics, workload is critical: "complaints"; and "priority customers";
vi) If message relates to a transaction over $100 (e.g., customer payment of a phone bill), message is critical; and
vii) If 10% of messages within 60 minutes are critical, workload is critical, else workload is non-critical.

These rules are by way of example only and are preferably configurable by an administrator at the resource. Whilst the rules above specify a defined time period of 60 minutes, measurements may equally based on activity in the period between polls, for example the number of messages received since the resource was last polled.

Rules of the kind discussed above enable rules engine 200 to make a determination as to how busy the resource is and also how critical the resource's workload actually is. The rules engine uses the rules in combination with the workload information maintained in database 190.

The reported workload can be used as input to a decision making process which can determine whether the monitoring of the resource should be modified in any way.

If the resource is extremely busy, then over-frequent monitoring could interfere with the processing of work by the resource. In order to avoid this, then a recommendation to extend the monitoring interval may be made in order to reduce the monitoring load.

If the resource is extremely lightly loaded, the resource may recommend that the monitoring interval again be extended. In the extreme case that the resource is not performing any work, then the monitoring may actually be causing the resource to consume system resources such as memory and CPU for no other purpose than to check that it is available, which may not be very relevant if the resource is idle but causes a large unwanted load on the system that may impact other resources or work.

Another extreme case is if the resource has a quiesce capability, in which case it could be beneficial to notify the monitor that since the resource is quiescing or has quiesced since the previous monitoring call, the monitor should not expend effort monitoring the resource that would detract from the performance of other active work on the system.

As shown in FIG. 3b, resource 50 comprises a state determiner 140 and a state modifier 160. State determiner determines the current workload of the resource. If the resource is currently idle and has been so, for a predetermined period of time, state modifier 160 is informed by component 140 that the resource should quiesce. Naturally both components work together to move the resource out of quiesce mode when new work is again received.

The criticality of the work performed by the resource affects the recommendation in the following ways.

If the workload is classified as critical, it may be important that the resource is monitored closely so that any outage is caught early and catered for. There is likely to be a higher cost to the business as a result of failures or downtime during critical periods. The Service Level Agreements for the system may apply more stringent criteria to critical workloads. Thus, if the resource is performing critical work, the monitoring interval could be shortened to provide better "liveness" of the perceived state of availability of the resource. If the resource is performing non-critical work then the monitoring interval could be lengthened.

Note that criticality of work being performed by the resource and the overall workload are orthogonal concepts. As an example, consider a messaging system which, since the previous monitoring call, has handled a huge number of non-essential (e.g. non-persistent) messages. Although the messaging system is very busy, the messages are of low importance and the overall system may have a Service Level Agreement (SLA) that can tolerate relatively slow monitoring of the messaging system.

A contrary example is a messaging system that has handled a very small number of essential and persistent messages; the SLA for the system may require that high importance messages lead to more frequent monitoring of the messaging system, because, for example, the SLA may specify that messages of a particular type must be processed within T seconds. Other metrics could be used to assess "criticality", such as message priority, transaction class, or even content within the messsage payload.

As mentioned earlier, as well as varying the monitoring interval it is possible for the resource to vary the monitoring depth. The monitoring depth can, similarly to interval, be the responsibility of the resource—which can vary the depth within its implementation of the monitoring interface. The resource may feedback to the monitor the level of checking being used and the result of such checking and the monitor may use such information, for example, in order to determine how to monitor in the future. For example, the monitor may monitor more frequently and may request a certain level of checking in the future.

As indicated above, although the decision making process is illustrated as box 145 in FIG. 3b (the resource), such a process may equally be found as part of the monitor instead.

When a recommendation is sent to the monitor, the monitor must decide how to act. This processing is discussed with reference to FIG. 5.

A status update is received at step 400. If the resource is not available or is running particularly slowly, then the monitor may initiate corrective action. This is indicated for the sake of completeness but is not in itself part of the invention. Consequently, this aspect will not be discussed in any more detail.

At step 410 feedback regarding monitoring interval is received by feedback receiver 110. As discussed above, such feedback may not be received in a separate step but may be piggybacked onto the status report sent at step 400.

Upon receiving feedback from the resource 50, it is determined by modifier component 120 whether it is appropriate to modify the status interrogator's monitoring interval (100, step 420). Such a determination may be made by comparing the recommended monitoring interval with the current monitoring interval and by taking into account other factors such as network congestion. As indicated previously, information regarding current monitoring interval is stored in monitoring data database 130. For example, the current monitoring interval might be defined as every 5 seconds.

A recommendation to extend the monitoring period to every 60 seconds might be provided as feedback to the monitor. Further, the monitor may be informed by the resource that the new depth of checking is "low", or that it is recommended that the resource requests a low level of checking in the future. Regarding monitoring interval, by comparing the current information with the recommendation and by taking other factors into account, the modifier component 120 is able to determine that a modification is appropriate and to make the appropriate changes within database 130 (step 430).

If modification is not appropriate, then the process loops round and awaits another status report. Note, although not shown here, status reports and feedback may be entirely independent of one another. An alternative solution may dispense with step 420 altogether and implement the recommendation made by the feedback component.

There may be intelligence provided at the resource which determines whether, based on the monitor's current monitoring interval and the depth being used, there is any need to use feedback in some way to affect the monitoring of the resource.

Whilst the FIG. 5 is specific to the monitor and its decision making process, the resource may use the feedback component's recommendation internally to decide whether or not the resource itself should change its monitoring behavior. For example, whether or not the resource should perform a different depth of monitoring to that currently being used or to that currently being requested by the monitor.

Note, a specific status report may not be sent to the monitor-status may instead be inferred from any information sent to by the resource to the monitor. For example, the receipt of information from the resource indicates at least that the resource is still alive.

The monitor should have prior knowledge of the capabilities of the resource in that regard and the type or meaning of workload metrics and/or any recommendation that the resource will be providing as feedback to any monitor. In this way, monitors can be coded to take advantage all the funtionality that a resource is likely to provide.

Preferably the resource advertises such information by way of a defined monitoring interface. For example, a resource may advertise to potential monitors a monitoring depth of "high"; "medium"; and "low". Similarly, a resource may advertise workload levels of "high"; "medium"; and "low". A resource may have a similarly defined workload criticality levels.

A resource preferably advertises the type of information and the format of the information that it may provide via feedback component 170. For example, all feedback may be provided in XML and certain prespecified identifying tags may be used. Once again, by conforming to a documented interface, it is possible for all resources and monitors to work to the same defined specification.

It should be appreciated that whilst the present invention has been described in terms of a recommended monitoring interval and depth, the invention is not intended to be restricted towards a solution that does both. A solution which makes provision for either in isolation is also useful.

Further, feedback may be provided by a resource to a monitor either in response to specific polling from the monitor. Alternatively the resource may "push" such feedback upon the monitor periodically.

Whilst particular information has been discussed as enabling a resource or monitor to determine an appropriate monitoring interval/depth, other information may equally be used. A business may have defined service level agreements (SLAs) and a monitor or resource may need to interpret such SLAs in order to provide an appropriate monitoring service (see above). An SLA may be used to derive the set of rules that are used to classify work and make recommendations.

Whilst the workload metrics component is disclosed as part of the resource, this does not have to be the case. Instead the resource could retrieve metrics from a component which is separate from the resource.

It should be appreciated from the foregoing, that such a solution is particularly advantageous since it enables the load placed on a resource as a result of monitoring to be adjusted based on factors such as recent workload and the type of work being performed by the resource. In this way system performance can be considerably enhanced.

What is claimed is:

1. A method for a resource to enable adaptive monitoring of the resource, the method comprising:
    retrieving metrics at the resource, the metrics representing workload of the resource;
    using the retrieved metrics representing workload of the resource to derive monitoring feedback, the monitoring feedback being a recommendation from the resource as to how the monitoring should be performed; and
    using the monitoring feedback from the resource as input to a decision making process controlling at least either the timing interval of the monitoring of the resource or the depth of the monitoring of the resource.

2. The method of claim 1, wherein using monitoring feedback further comprises:
    providing the monitoring feedback from the resource to a monitor;
    inputting the monitoring feedback to a decision making process at the monitor; and
    determining at the monitor, after inputting the monitoring feedback, not to adapt monitoring processes.

3. The method of claim 1, further comprising:
    receiving a request at the resource from a monitor for the status of the resource, and wherein the workload metrics are collected between the status request and a subsequent status request.

4. The method of claim 1, wherein the metrics comprise at least: the amount of work that the resource is processing; or the criticality of the work that the resource is processing.

5. The method of claim 1, further comprising:
    applying at least one quantitative rule to derive monitoring feedback.

6. The method of claim 1, wherein using the monitoring feedback from the resource as input to a decision making process comprises calculating the monitoring interval used by a monitor.

7. The method of claim 1, wherein using the monitoring feedback as input to a decision making process comprises determining a recommended level of checking the resource.

8. The method of claim 1, wherein using the monitoring feedback comprises the resource recommending a monitoring depth to a monitor monitoring the resource.

9. The method of claim 1, further comprising at least one of:
    using environmental data in addition to workload metrics; or
    using service level agreement data in addition to workload metrics.

10. The method of claim 1, further comprising:
    determining that the resource is about to change between running and quiescent states; and
    using such a determination as input to the decision making process.

11. The method of claim 1, further comprising:
    determining that a predetermined amount of work received at the resource is critical; and
    recommending that the monitoring depth be increased.

12. The method of claim 1, further comprising:
    using workload metrics at the resource to derive monitoring feedback in response to a status request from a monitor.

13. The method of claim 1, wherein the feedback from the resource comprises, a polling interval of the resource, and the proportion of time that the resource is quiescent relative to the time spent in the running state.

14. The method of claim 5 wherein the quantitative rule includes at least one of the following:
    whether the number of messages received at the resource in a defined time period exceeds a target value;
    whether any messages received at the resource within a time period must be logged;
    if a message received at the resource relates to a transaction value over an identified value; or
    if a defined percentage of messages received at the resource in a defined period are identified as critical.

15. The method of claim 7 wherein the monitoring depth may be selected from defined categories of monitoring depth, the categories differing in the intensity of checking of the resource.

16. The method of claim 1 further comprising:
    retrieving environmental data at the resource.

17. The method of claim 16 further comprising:
    retrieving quantitative rules at the resource; and
    deriving monitoring feedback using the retrieved quantitative rules.

18. The method of claim 1 further comprising:
    retrieving environmental data at the resource; and
    retrieving quantitative rules at the resource,
    wherein deriving monitoring feedback at the resource further includes using the retrieved environmental data and the retrieved quantitative rules.

19. The method of claim 1 wherein the monitoring feedback from the resource is the controlling input to a decision making process controlling at least either the timing interval of the monitoring of the resource or the depth of the monitoring of the resource.

20. A method for adaptive monitoring by a monitor of a resource in a network, the method comprising:
    receiving monitoring feedback from the resource, the monitoring feedback being a recommendation derived by the resource as to how the monitoring should be performed, the resource deriving the recommendation after retrieving workload metrics and environmental data; and
    using the monitoring feedback at a monitor to determine whether to adapt the way in which the monitor is monitoring the resource.

21. The method of claim 20, comprising requesting a new monitoring depth from the resource.

22. The method of claim 20, further comprising:
changing the monitoring interval after receiving instructions at the resource from the monitor.

23. The method of claim 20 wherein the resource derives the recommendation after retrieving workload metrics, environmental data, and quantitative rules, and also wherein the resource recommendation is derived using the retrieved workload metrics, the retrieved environmental data and the retrieved quantitative rules.

24. A system to enable adaptive monitoring of a resource, the system comprising:
resource means for using metrics retrieved by a resource about workload received at the resource from at least one client to derive monitoring feedback, the monitoring feedback being a recommendation from the resource means regarding at least either the timing for performing monitoring of the resource or the depth of the monitoring of the resource; and
monitoring means for using the monitoring feedback from the resource means as input to a decision making process controlling the monitoring of the resource having the resource means.

25. The system of claim 24, wherein the monitoring means for using monitoring feedback comprises
means for providing the monitoring feedback to a monitor to enable the monitor to determine whether to adjust its monitoring of the resource in line with the received feedback.

26. Apparatus for adaptive monitoring by a monitor of the resource in a network, the apparatus comprising:
a monitor for receiving monitoring feedback from the resource, the monitoring feedback being a recommendation derived by the resource using resource metrics retrieved by the resource, as to how the monitoring should be performed; and
a modifier for using the monitoring feedback to determine whether to adapt the way in which the monitor is monitoring the resource.

27. The system of claim 26 wherein when adapting the way in which the monitor monitors the resource, the means for using the monitoring feedback determines whether to change the monitoring frequency of the resource.

28. The system of claim 26 wherein when adapting the way in which the monitor monitors the resource, the means for using the monitoring feedback determines whether to change the depth of the monitoring of the resource.

29. A computer program product for a resource to enable adaptive monitoring of the resource, the computer program product comprising:
a non-transitory computer readable storage medium having computer readable program code embedded therein, the computer readable program code comprising:
computer readable program code configured to use metrics about workload received at the resource executing the computer readable program code to derive monitoring feedback, the monitoring feedback being a recommendation from the resource executing the computer readable program code as to how the monitoring should be performed; and
computer readable program code configured to receive monitoring instructions from a monitor after the monitor received a recommendation from the resource regarding the monitoring of the resource and further configured to follow the monitoring instructions for the resource from the monitor.

30. The computer program product for a resource of claim 29 wherein the non-transitory computer readable storage medium has further computer readable program code embedded therein comprising:
computer readable program code configured to use environmental data to derive monitoring feedback, the monitoring feedback being a recommendation from the resource executing the computer readable program code as to how the monitoring should be performed; and
computer readable program code configured to use quantitative rules to derive monitoring feedback, the monitoring feedback being a recommendation from the resource executing the computer readable program code as to how the monitoring should be performed.

* * * * *